United States Patent Office 2,823,099
Patented Feb. 11, 1958

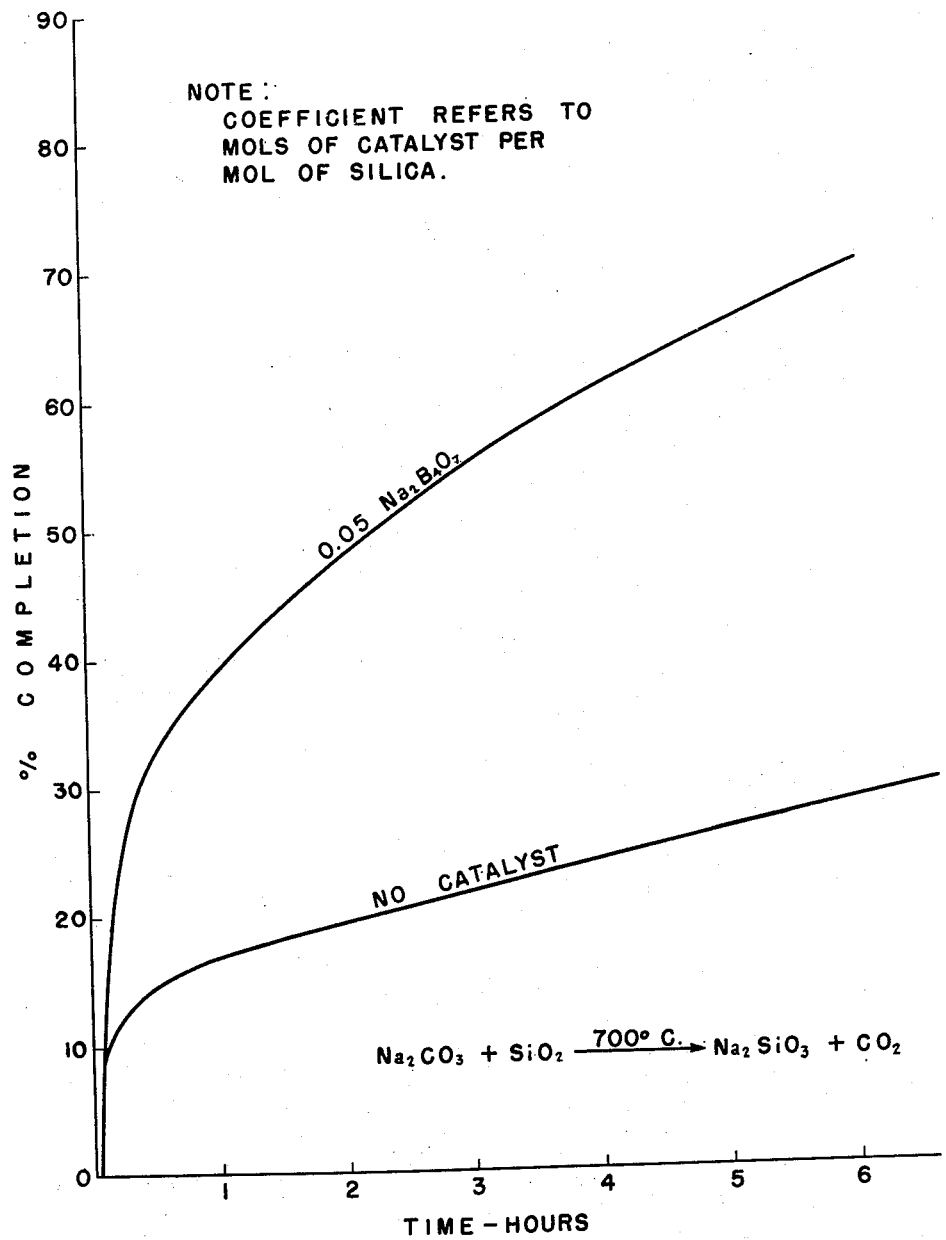

2,823,099

PRODUCTION OF SILICATES

Isadore Mockrin, Philadelphia, Pa., assignor to Pennsalt Chemicals Corporation, a corporation of Pennsylvania Application May 28, 1954, Serial No. 433,033

10 Claims. (Cl. 23—110)

The present invention relates to the manufacture of silicates and more particularly to improvements in the process of manufacturing silicates wherein the silicate is prepared by a substantially dry state reaction between an alkali metal carbonate and silica.

It has heretofore been proposed to react an alkali metal carbonate, such as, sodium carbonate with silica in a substantially dry state to form sodium silicate. The process is particularly desirable from the standpoint of economy since sodium carbonate is substantially less expensive than sodium hydroxide as a source material for the $Na_2O$. The reactions have the objectionable feature, however, that temperatures in excess of 850° C. have been necessary in order to obtain a sufficiently rapid reaction to make the process commercially feasible.

At temperatures much in excess of 850° C. a melt occurs, particularly during the early stages of the reaction, which is corrosive and tends to attack the equipment in which the reaction is being carried out.

In order to avoid any substantial occurrence of melt while carrying out the reaction between the sodium carbonate and the silica, it has been proposed to first heat a mixture of the reactants to a temperature below 850° C. for a time sufficient to volatilize substantial amounts of $CO_2$ and thereafter raise the temperature (still maintaining it as a temperature below which any melt occurs) to increase the rate of reaction. In this manner the reaction can be carried out at sufficiently high temperatures to obtain a reasonable reaction rate while avoiding the occurrence of any substantial amount of melt. This process, however, has the inherent difficulty of requiring careful control in order to be sure that the temperature is not elevated too soon. Also, the high temperatures required add to the expense of obtaining the final product and are generally objectionable.

In my co-pending application Serial No. 433,031, filed of even date herewith, i. e., May 28, 1954, a process is described wherein substantially dry state reactions between alkali metal carbonates and silica are catalyzed by the inclusion of small amounts of inorganic halogen compounds. The present invention is drawn to the further discovery that these reactions are also catalyzed by inorganic tetraborates.

By the addition of small amounts of inorganic tetraborates to the reaction mixture, the reaction can be substantially accelerated at temperatures well below that at which any melt occurs. The inorganic tetraborates have been found to act as catalysts even when present in amounts as low as 0.03 mol inorganic tetraborate per mol of $SiO_2$ present.

The surprising catalytic effect obtained by the addition of the above mentioned inorganic tetraborates is well illustrated by the accompanying drawing which contains curves showing the reaction rate at 700° C. for the reactants, sodium carbonate and silica in the presence of an inorganic tetraborate catalyst and in the absence of any catalyst.

The curves, which are the results of actual experiments, are given for the purpose of illustration, and the invention is not limited to the specific inorganic tetraborate shown. I believe that all inorganic tetraborates have this catalytic effect. Thus, any of the compounds $CaB_4O_7$, $Li_2B_4O_7$ and $K_2B_4O_7$ may be added as a catalyst to catalyze the reraction in place of the specific inorganic tetraborate shown in the drawing. The preferred inorganic tetraborates are those of sodium and potassium since no insoluble products would be brought into the reaction product through their use.

In practicing the present invention, temperatures as low as 600° C. can be used. However, it is generally preferred to carry out the reaction between the alkali metal carbonate and the $SiO_2$ source material at a temperature within the range of 650° C. to just below the temperature at which any substantial melt may occur. This upper limit will in general be approximately 850° C. at atmospheric pressure during the early stages of the reaction for sodium carbonate. For the other alkali metal carbonates it will vary with their melting temperatures. However, somewhat higher temperatures may be used if desired as long as no substantial amount of melt occurs, since the presence of an inorganic tetraborate accelerates the reaction even at the higher temperatures. Some mixtures of silica and alkali metal silicates have somewhat lower melting temperatures than the alkali metal carbonates used. In such instances, the temperature should be maintained below the melt temperature of the product.

It is generally preferred to use a finely-divided silica, the preferred particle size generally being minus 325 mesh. However, the process can be practiced successfully with silica in particle sizes as high as −65 +115 mesh.

The rate of the reaction can be varied markedly by varying the ratio of alkali metal carbonate to silicon dioxide. In practicing the present invention, the reactants are generally present in a silica to alkali metal carbonate to mol ratio of 1:2 to 3:1. Where there is no objection to having some unreacted silica in the final product, the preferred ratio of silica to alkali metal carbonate in the reaction mixture is about 1.5:1 to 3:1.

The rate of reaction can be increased still further by substituting an alkali metal hydroxide for part of the alkali metal carbonate. A surprising result obtained by substituting an alkali metal hydroxide for part of the alkali metal carbonate is that the resulting products give clearer solutions, when dissolved in water, than those prepared from reactants containing no alkali metal hydroxides.

Where the alkali metal carbonate is replaced in part by the alkali metal hydroxide, the alkali metal hydroxide is preferably used in amounts of 0.1 to 0.7 mol alkali metal hydroxide per mol alkali metal carbonate.

In order to better illustrate the practice of the present invention, the following example is given:

Sodium silicate was prepared by first grinding together for about two minutes 6.01 parts by weight sodium carbonate, 3.41 parts by weight silica of minus 325 mesh size and 0.57 part by weight of sodium tetraborate. The mixture corresponded to the following formulation:

$$0.05\ Na_2B_4O_7 + Na_2CO_3 + SiO_2$$

The ground reactants were heated for about five hours at 700° C. after which time the reaction was found to be 66% complete.

As previously stated, any of the inorganic tetraborates can be used as catalysts and any of the alkali metal carbonates may be employed together with a suitable source of $SiO_2$. The conditions of the reaction would be substantially the same as those of the above example.

Having thus described my invention, I claim:

1. In the preparation of alkali metal silicates, the process comprising heating, in a substantially dry state, a mixture containing an alkali metal carbonate, silicon dioxide and an inorganic tetraborate to a temperature of from 600° C. to a temperature below that of which any appreciable melt occurs, the mol ratio of silicon dioxide to alkali metal carbonate in said mixture being within the range of from 1:2 to 3:1.

2. The process of claim 1 wherein the inorganic tetraborate is a tetraborate of a metal of the group consisting of sodium and potassium.

3. In the preparation of alkali metal silicates the process comprising heating, in a substantially dry state, a mixture containing an alkali metal carbonate, silicon dioxide and an inorganic tetraborate, in which said alkali metal carbonate is selected from the group consisting of sodium carbonate, potassium carbonate, rubidium carbonate and caesium carbonate, and in which the mol ratio of silicon dioxide to alkali metal carbonate is within the range of 1:2 to 3:1, said heating being at a temperature within the range of 650° C. to a temperature just below that at which any substantial melt occurs.

4. The process of claim 1 wherein said inorganic tetraborate is present in amounts of at least .03 mol inorganic tetraborate per mol silicon dioxide.

5. The process of claim 1 wherein the silicon dioxide to alkali metal carbonate mol ratio is within the range of 1.5:1 to 3:1.

6. In the preparation of alkali metal silicates the process comprising heating, in a substantially dry state, to a temperature of 600° C. to just below where any appreciable melt occurs, a mixture consisting essentially of an alkali metal carbonate, an alkali metal hydroxide, silicon dioxide, and a small amount of an inorganic tetraborate, in which mixture the mol ratio of silicon dioxide to the sum of the alkali metal oxide content of the alkali metal carbonate and alkali metal hydroxide is 1:2 to 3:1 and in which said alkali metal hydroxide is present in amounts of 0.1 to 0.7 mol alkali metal hydroxide per mol alkali metal carbonate.

7. The process of claim 6 wherein said inorganic tetraborate is a tetraborate of a metal of the group consisting of sodium and potassium.

8. The process of making sodium metasilicate comprising reacting in a substantially dry state sodium carbonate with silicon dioxide in the presence of an inorganic tetraborate at a temperature within the range of 600° C. to a temperature just below that at which any appreciable melt occurs.

9. The process of claim 8 wherein the inorganic tetraborate is a tetraborate of a metal of the group consisting of sodium and potassium.

10. The process of claim 8 wherein the silicon dioxide to sodium carbonate mol ratio is within the range of 1:2 to 3:1 and the reaction is carried out at a temperature of 650° to 850° C.

References Cited in the file of this patent

UNITED STATES PATENTS

| Re. 21,703 | Burkhart | Feb. 4, 1941 |
| 2,219,646 | Beecher | Oct. 29, 1940 |
| 2,239,880 | Curll | Apr. 29, 1941 |
| 2,357,723 | Beecher et al. | Sept. 5, 1944 |
| 2,374,035 | Nutting | Apr. 17, 1945 |

OTHER REFERENCES

Howarth et al.: "J. of Soc. of Glass Technology," vol. 17, Transactions, 1933, pages 25–49.